United States Patent
Clark et al.

(10) Patent No.: US 7,016,689 B2
(45) Date of Patent: **\*Mar. 21, 2006**

(54) METHOD AND APPARATUS FOR A WIRELESS TELECOMMUNICATION SYSTEM THAT PROVIDES LOCATION-BASED MESSAGES

(75) Inventors: Doug Clark, Morristown, NJ (US); Nicholas James DiPatri, Morristown, NJ (US); Michael Andrew Holmes, Morristown, NJ (US); Alex Matsuevich, Morris Plains, NJ (US); Mathew John Robinson, Morris Plains, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 252 days.

This patent is subject to a terminal disclaimer.

(21) Appl. No.: 10/634,750

(22) Filed: Aug. 6, 2003

(65) Prior Publication Data

US 2004/0029577 A1 Feb. 12, 2004

Related U.S. Application Data

(63) Continuation of application No. 09/440,046, filed on Nov. 15, 1999, now Pat. No. 6,611,687.

(51) Int. Cl.
*H04Q 7/20* (2006.01)

(52) U.S. Cl. ............... 455/456.1; 455/466; 455/404.2; 701/200

(58) Field of Classification Search .. 455/456.1–456.6, 455/457, 404.2, 412.2, 422.1, 466; 701/21–213, 701/117; 340/988, 990, 995
See application file for complete search history.

(56) References Cited

U.S. PATENT DOCUMENTS

| | | | |
|---|---|---|---|
| 5,461,390 A | | 10/1995 | Hoshen .................... 342/419 |
| 5,502,757 A | | 3/1996 | Bales et al. ................... 379/58 |
| 5,559,520 A | * | 9/1996 | Barzegar et al. ............ 701/213 |
| 5,808,566 A | | 9/1998 | Behr et al. ................... 340/995 |
| 5,818,356 A | | 10/1998 | Schuessler .................. 340/995 |
| 6,044,263 A | * | 3/2000 | Valentine et al. ......... 455/414.1 |
| 6,073,013 A | * | 6/2000 | Agre et al. ................. 455/428 |
| 6,112,074 A | * | 8/2000 | Pinder ..................... 455/404.2 |
| 6,119,013 A | * | 9/2000 | Maloney et al. ......... 455/456.2 |
| 6,167,275 A | * | 12/2000 | Oros et al. ................ 455/456.2 |
| 6,249,740 B1 | | 6/2001 | Ito et al. ..................... 701/200 |
| 6,292,743 B1 | | 9/2001 | Pu et al. ..................... 701/202 |

(Continued)

FOREIGN PATENT DOCUMENTS

WO     WO-97/41654     11/1997

(Continued)

OTHER PUBLICATIONS

Japanese Patent Abstract, Publication No. 10013961, Jan. 16, 1998.

Primary Examiner—Joseph Feild
Assistant Examiner—Kamran Afshar (57) ABSTRACT

A wireless telecommunication system receives information from a wireless mobile unit and determines that the wireless mobile unit is within a designated region. Information specific to the designated region is received at a centrally located location-based message server. As the traveler enters the designated region, the wireless mobile unit then receives information specific to the designated region such as information relating to traffic problems or desired locations within the region. Alternatively, a problem is identified and designated as relating to a particular region, and wireless mobile units within the designated region are then identified so that information relating to the problem can be output thereto. As such, information specific to a region occupied to a traveler is received.

21 Claims, 5 Drawing Sheets

U.S. PATENT DOCUMENTS

| | | | |
|---|---|---|---|
| 6,351,647 B1 * | 2/2002 | Gustafsson | 455/466 |
| 6,400,956 B1 * | 6/2002 | Richton | 455/456.3 |
| 6,463,273 B1 * | 10/2002 | Day | 455/404.1 |
| 6,484,032 B1 * | 11/2002 | Okada | 455/456.1 |
| 6,590,529 B1 * | 7/2003 | Schwoegler | 342/357.13 |
| 6,611,687 B1 * | 8/2003 | Clark et al. | 701/200 |
| 6,748,225 B1 * | 6/2004 | Kepler | 455/456.2 |
| 6,836,667 B1 * | 12/2004 | Smith, Jr. | 455/456.1 |
| 2001/0001848 A1 | 5/2001 | Oshizawa et al. | 701/210 |

FOREIGN PATENT DOCUMENTS

WO      WO-98/08314 A1     2/1998

* cited by examiner

METHOD AND APPARATUS FOR A WIRELESS TELECOMMUNICATION SYSTEM THAT PROVIDES LOCATION-BASED MESSAGES

CROSS-REFERENCE TO RELATED APPLICATIONS

This application claims domestic priority benefits under 35 U.S.C. §120 and is a continuation of the following U.S. patent application: U.S. application Ser. No. 09/440,046 to Doug CLARK et al., filed 15 Nov. 1999 now U.S. Pat. No. 6,611,687 and entitled "METHOD AND APPARATUS FOR A WIRELESS TELECOMMUNICATION SYSTEM THAT PROVIDES LOCATION-BASED MESSAGES." The contents of the above application is incorporated by reference in its entirety herein.

BACKGROUND OF THE INVENTION

1. Field of the Invention

The present invention relates to telecommunications in general, and, more particularly, to a wireless telecommunications system.

2. Description of Related Art

Figure 1:
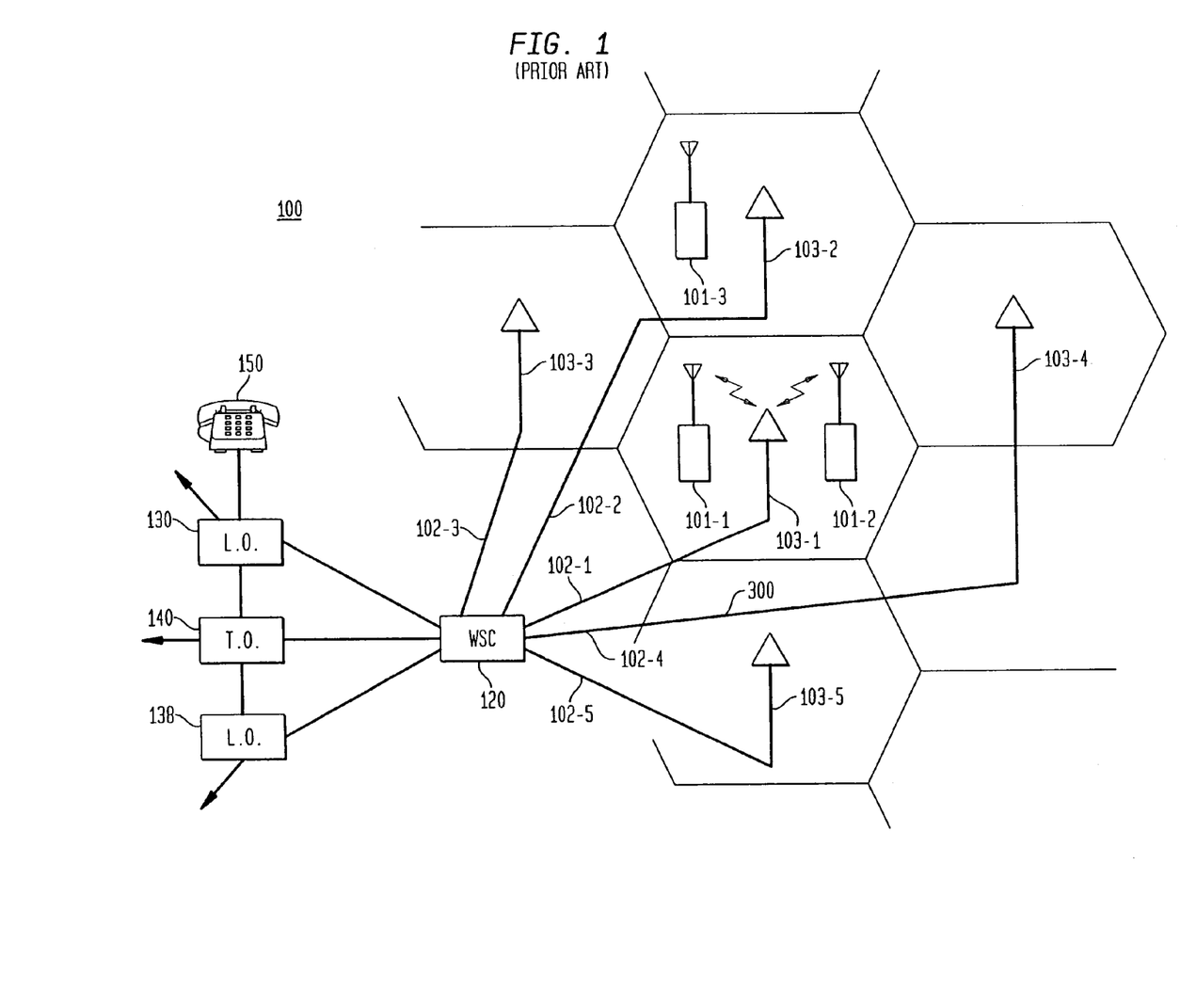
FIG. 1 is a schematic diagram of a known wireless telecommunication system.

FIG. 1 depicts a schematic diagram of a portion of a known wireless telecommunications system, providing wireless telecommunications service to a number of wireless mobile units (e.g., wireless mobile units 101-1 through 101-3) that are situated within a geographic region. The heart of a typical wireless telecommunications system is a wireless switching center ("WSC") 120. Typically, the WSC 120 is connected to a plurality of base stations (e.g., base stations 103-1 through 103-5) that are dispersed throughout the geographic region serviced by the system and to the local and long-distance telephone and data networks (e.g., local-office 130, local-office 138 and toll-office 140). WSC 120 is responsible for, among other things, establishing and maintaining a call between a first wireless mobile unit and a second wireless mobile unit or, alternatively, between a wireless mobile unit and a wireline mobile unit (e.g., wireless mobile unit 150), which is connected to the system via the local and/or long-distance networks.

The geographic region serviced by a wireless telecommunications system is partitioned into a number of spatially distinct areas called "cells." As depicted in FIG. 1, each cell is schematically represented by a hexagon. In practice, however, each cell has an irregular shape that depends on the topography of the terrain surrounding the cell. Typically, each cell contains a base station, which comprises the radios and antennas that the base station uses to communicate with wireless mobile units in that cell and also comprises the transmission equipment that the base station uses to communicate with the WSC 120. However, locating wireless mobile units within a cell was often difficult.

Figure 2:
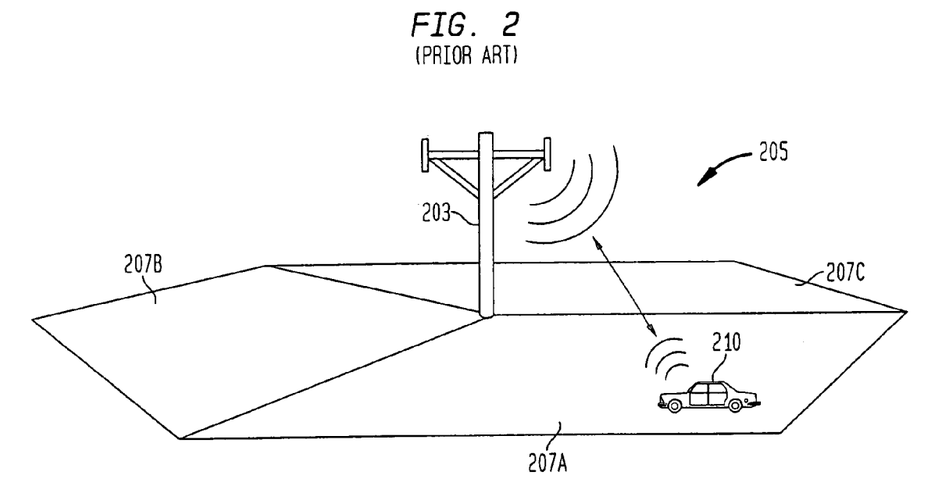
FIG. 2 is a diagram of area sectors covered by base stations in a wireless network.

Prior art FIG. 2 illustrates a base station 203 and the typical coverage area of a three sector antenna typically utilized on a base station 203. Since the base station antenna typically has three sectors (which are typically 3 separate antennas), each of the three sectors covers about a 120° area of the cell 205. These three sectors, labeled 207a, 207b, and 207c each correspond to one of the three sector antennas of base station 203.

When a wireless mobile unit 210, shown being utilized in a car in FIG. 2 for example, is turned on, the nearest cell site or base station such as base station 203 becomes aware of its location in terms of antenna face or sector direction. Thus, the base station 203 is not only aware of wireless mobile unit 210, but it is also aware that the wireless mobile unit 210 is within a particular sector of its coverage region, such as sector 207a. Hence, the base station 203 knows the approximate geographic location of wireless mobile unit 210. This method of locating a wireless mobile unit 210 requires only one cell site or base station 203, although the area covered by the sector could be quite large.

Figure 3:
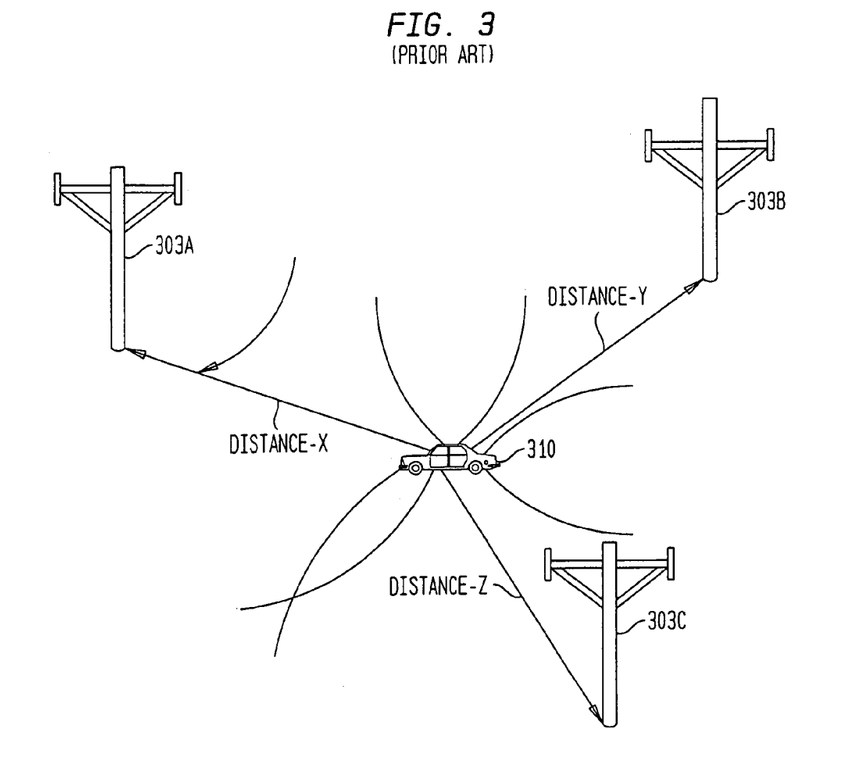
FIG. 3 is a diagram of the use of triangulation to locate a wireless mobile unit.

Prior art FIG. 3 depicts a known triangulation technique for locating the wireless mobile unit 310. Using this triangulation technique, three base stations 303a, 303b, and 303c are used to pinpoint the location of wireless mobile unit 310. A propagation delay between the wireless mobile unit 310 sending a message to each of the three base stations 303a, 303b, and 303c is used to determine the distance to the wireless mobile unit 310, such as distance X, distance Y and distance Z as shown in prior art FIG. 3. Triangulation requires the cell sites to be synchronized to a reference clock so when the wireless mobile unit 310 contacts each of base stations 303a, 303b, and 303c, a time stamp of when the message was received is created. Then, the time stamps are compared and used to determine the exact location using radio wave propagation characteristics and some rudimentary mathematics. This method requires three cell sites for accurate positioning.

Further, global positioning systems (GPS) have recently been developed to the point where they are cheap to implement. Thus, such systems may soon be prevalent in wireless mobile units to determine the precise location thereof. In addition, in an area of wireless technology, assisted GPS is being developed to improve on normal GPS for position or location detection of wireless mobile units. In addition, other position determining systems are constantly being developed. Thus, with all these various ways being developed to locate a wireless mobile unit and to pinpoint the location of the wireless mobile unit, a need exists to create other uses for the location or position information of wireless mobile units.

Further, as wireless units, such as those in cars for example, travel from region to region a user might find information specific to the particular region to be quite useful. For example, weather warnings, traffic problems or other road problems, if received by the user, would allow the user to take appropriate action. Knowing about traffic accidents on major highways or roads closed for construction would enable the user to find an alternate route to avoid the problem. Thus, a need exists for getting region-specific information to a user.

SUMMARY OF THE INVENTION

The present invention is directed to a wireless telecommunication system or method that uses location or position information of a wireless mobile unit to enable the sending of messages to travelers. As it is determined that the wireless mobile unit has entered a designated region for example, information specific to the designated region is output for the wireless mobile unit (information which is eventually output to the wireless unit via a base station, for example). In another embodiment, information relating to a problem in a designated region is received; wireless mobile units located within the designated region are identified; and information related to the problem is output to the wireless mobile units located in the designated region. As such, information specific to that of a designated region is output to users within the region so that they can make use of the information in a timely manner.

BRIEF DESCRIPTION OF THE DRAWINGS

The present invention will become more fully understood from the detailed description given herein below and the accompanying drawings which are given by way of illustration only, and thus are not limitative of the present invention, wherein like reference numerals represent like elements and wherein.

DETAILED DESCRIPTION

The various aspects of the present invention enable the use of both telecommunications capability and regional location-finding capability of a wireless telecommunication system to disseminate region related information to wireless mobile units within the region. In one preferred embodiment, it is determined that the wireless mobile unit has entered a designated region and information, such as traffic information or information relating to problems within the region, for example, is output for the wireless mobile unit upon determining that the wireless mobile unit has entered the designated region. This information is eventually output to the wireless mobile unit via a base station, for example. In another embodiment, information relating to a problem within a region of a wireless communication network is received; wireless mobile units located within the designated region are identified; and information related to the problem within the region is output to the wireless mobile units located within the region. As such, information of specific use to a user, such as information about the region wherein the user is located, is easily disseminated to the user. Therefore, advances in location-based technology which more and more accurately identify the location or position of a user are utilized in a timely manner to allow users to prepare for and potentially avoid problems within a region in which they are located or are approaching; or provide users with more information about the region itself.

Figure 4:
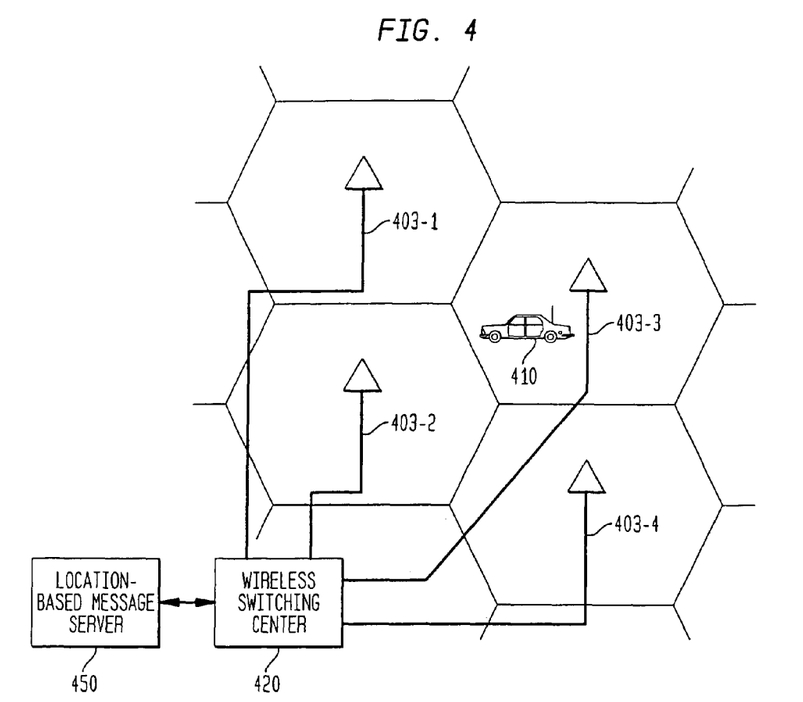
FIG. 4 is a schematic diagram of a wireless telecommunication system including the location-based message server of an embodiment of the present invention.

FIG. 4 is a schematic diagram of a wireless telecommunication system including a location-based message server 450 of a preferred embodiment of the present invention. The system includes a wireless switching center (WSC) 420 connecting the location-based message server 450 with base stations 403-1 through 403-4, wherein it is understood that the number of base stations is exemplary only. Such a system is capable of: (1) providing wireless telecommunication service to the wireless mobile unit 410 (designated as a wireless mobile unit within a car for illustrative purposes only in FIG. 4), including location-based services based on location of the wireless mobile unit 410; (2) monitoring the movement (changing location from region to region or cell to cell for example) of wireless mobile unit 410 as it remotely travels; and (3) providing location-based or region-based information back to the wireless mobile unit 410 through WSC 420 and through base stations 403-1 through 403-4, based on the observed changing location or entrance of the wireless mobile unit 410 into different cells or regions. The location-based message server 450 is responsible for providing all location-based message services for the wireless mobile unit 410.

Figure 5:
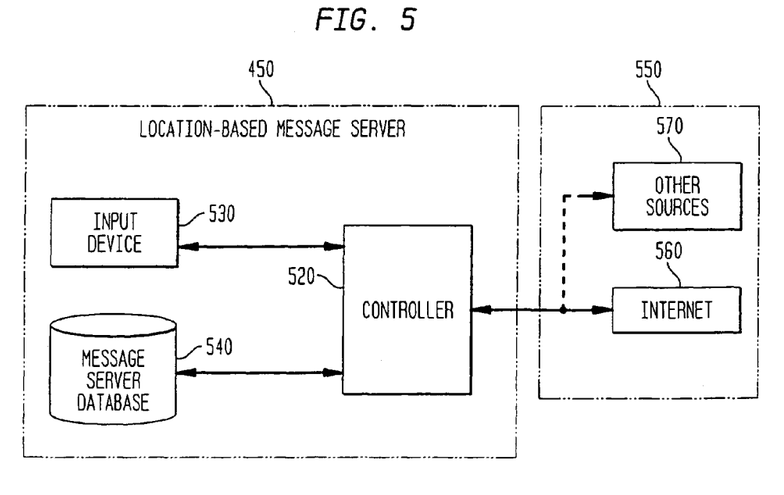
FIG. 5 is a block diagram of the salient component of the location-based message server of FIG. 4 and connections to external devices.

FIG. 5 is a block diagram of the salient components of location-based message server 450. The location-based message server 450 includes a controller 520. The controller 520 is connected to each of a message server data base 540; and an input device 530. It should be understood that controller 520 of location-based message server 420 sends and receives signals and other information to and from the wireless mobile unit 410, through WSC 420 and base-stations 403-1 through 403-4 shown in FIG. 4 (although not repeated in FIG. 5 for clarity). The input device 530 can be any input device such as a keyboard, mouse, etc. for inputting information to controller 520, and for storage in message server data base 540. The controller 520 is, for example, computer programmed to orchestrate location-based message services, for a plurality of geographic regions such as those serviced by wireless switching center 420, wherein the services include sending information back to the wireless mobile unit 410 through WSC 420 and the base stations, such as information relating to traffic problems, alternate routes, stores or fuel sources (such as gasoline stations for example), etc. The controller 520 controls the operation of other elements in the location-based message server 450.

The message server data base 540 is a data base or memory that contains, among other things, digitized maps of geographic areas or regions such as those within a particular cell serviced by a base station for example, preferably including digitized maps of a plurality of geographic areas or cells, such as those served by wireless switching center 420. These maps are used by controller 520 for comparison purposes with a current location of wireless mobile unit 410 to determine whether or not the wireless mobile unit 410 is within a specific geographic region, or is within a region neighboring a particular geographic region. The maps and such within message server data base 540 are further used for comparison to information received by controller 520 from an external source 550, such as the Internet 560 or other external services 570, for determination by the controller 520, of problems within the designated region; and/or for determination of alternate routes within the geographic region based upon information being received from external source 550 indicating a problem within a particular geographic region. The geographic data and related data may be embodied in a Geographic Information System (GIS), for example. Further, although controller 520 of location-based message server 450 is shown directly connected to external sources 550 in FIG. 5, such a connection could be indirect through WSC 420 or even wireless through base stations 403-1 to 403-4, for example.

Message server data base 540 further preferably contains not only the GIS data base, but also GIS processing software that enables geographic functions, chiefly determining relationships between various geographic regions in the position or location of wireless mobile unit 410 enabling the functionality described herein as will be explained in more detail hereafter. Some personal preferences may also be established in message server data base 540 which may create an understanding for the processing of information such as particular roads or regions frequently used by a user of wireless mobile unit 410; specific information desired to be received such as traffic information for example; information identifying the wireless mobile unit 410 as a subscriber to a service desiring dissemination of the information disseminated by the present invention; etc.

The external information sources 550, including the Internet 520 and other sources 570, will generally be established separately from message server data base 540, but in a manner consistent therewith. Information can be requested in a specific manner or in an ongoing basis from controller 520 accessing any external information source 550 through WSC 420, for example.

Message server data base 540 further preferably contains a list of services to be performed in association with a designated wireless mobile unit 510 and the geographic area (places/roads/stores/fuel sources such as gas stations etc.) that will be considered to meet a criteria for initiating the services to be performed. These can be customized by the user. For example, the service which might be desired by a user might be that of receiving an indication of problematic information within a geographic region such as a road closure, severe traffic problems, a downed tree in an area, etc. for any one of a plurality of geographic regions. Thus, when information is received by controller 520 relating to such a problem, controller 520 will locate and output information to all wireless mobile units 410 located within the geographic region subscribing to such a service.

Additionally, if the wireless mobile unit 410 desires to receive traffic information specific to a designated region, it can subscribe to this service such that when the wireless mobile unit 410 has entered the designated region, information relating to the region such as traffic information will be output to the wireless mobile unit 410. This can be output based upon a wireless mobile unit 410 merely transponding a pilot signal back to a base station in a known manner, to thereby enable the base station and thus controller 520 to locate that a wireless mobile unit 410 has entered a particular geographic region; or it can be based upon a signal received from a wireless mobile unit 410, indicating that the wireless mobile unit 410 desires this type of information, wherein the controller 520 will thereafter determine that a wireless mobile unit 410 has entered a particular geographic region and will output information relating to the particular geographic region to the wireless mobile unit 410.

Controller 520 can also include a location determining server (not shown) for determining a location of a wireless mobile unit 410 when requested to do so by controller 520 to provide controller 520 with that information when it is obtained. The location determining server can be part of controller 520 or can be a separate component in location-based message server 450 for determining location.

It should be noted that the location of wireless mobile unit 410 can be determined in a number of known ways including using information received from a wireless mobile unit 410 itself (through a base station and WSC 420, eventually reaching location-based message server 450) based upon a global positioning system (GPS) or assisted GPS used in conjunction with the wireless mobile unit 410 and signals 506 sent therefrom; or based upon and other known techniques such as cell or sector location or triangulation techniques achieved at a base station, wherein the base stations then transmit the location of wireless mobile unit 410 to location-based message server 450 via wireless switching center 420. How the location information is obtained is not limitative of the present invention. Controller 520, in conjunction with message server data base 540 and with other location-based determining techniques or a location determining server, determines the identification of wireless mobile units within or entering a particular region (or neighboring a particular region) and monitors the units and information received from external source 550.

As previously stated, the location or position of wireless mobile unit 410 may be obtained in a plurality of ways. The wireless mobile unit 410 may contain the functionality needed to locate itself, and may send results to a signal 506 to the location-based message server 450; such as through GPS or modified GPS circuitry within the wireless mobile unit 410 itself. Alternatively, the location or position can be determined in a known manner through triangulation, base station sector information, etc. at the location-based message server 450 or WSC 420. Those familiar with wireless location technology/functioning will recognize that for the services disclosed therein, it does not matter whether geographic location or position results are calculated in the network or in the wireless mobile unit 410 itself.

Figure 6:
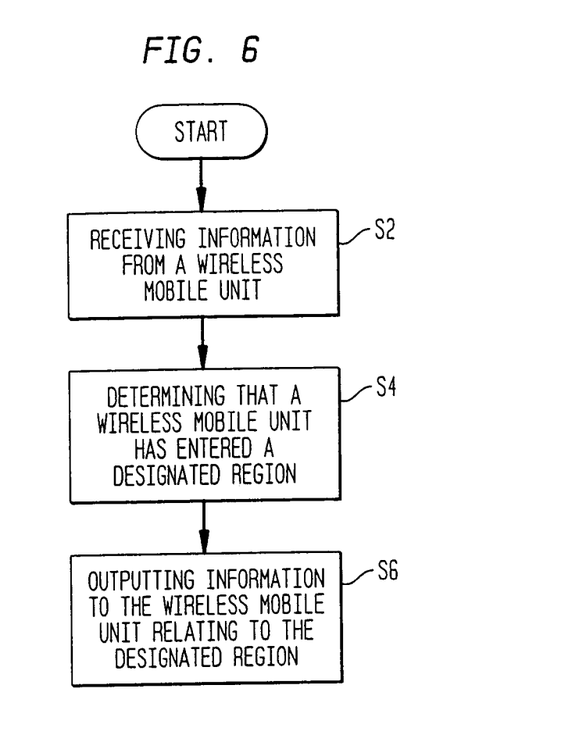
FIG. 6 is a flowchart illustrating a method of operation of a first embodiment of the present application.

FIG. 6 is a flowchart of the operation of one preferred embodiment of the present application.

Initially, in Step S2, information is received from a wireless mobile unit 410, through a controlling base station and WSC 420, at location-based message server 450. This information can be merely that of a wireless mobile unit 410 transponding a received pilot signal to a base station thereby indicating that a wireless mobile unit 410 is within a region or sector of a base station; can include a specific signal for determining a location of a wireless mobile unit 410 such as a GPS or assisted GPS signal; or can include a specific request for information from a wireless mobile unit 410.

Thereafter, in Step S4, based upon this received information, it is determined that a wireless mobile unit 410 has entered a region. For example, if the wireless mobile unit 410 transponds a signal back to a particular base station, the location-based message server 450 then knows the particular region or sector that the wireless mobile unit 410 has entered. Thus, this becomes the designated region for that particular wireless mobile unit 410.

Finally, in Step S6, information is output from location-based message server 450 for the wireless mobile unit 410 relating to the designated region, or alternatively (or additionally) relating to a region neighboring the designated region. This information is then output to the wireless mobile unit 410 via the WSC 420 and controlling base station. Depending on a particular service that a user has signed up for or depending on the type of information provided by location-based message server 450, information such as traffic information for the designated region; particular problems associated with the designated region; and/or location of various places within the designated region such as fuel sources or gasoline stations within the region are output for, and eventually to the wireless mobile unit 410. This information can then be output at the wireless mobile unit 410 in any number of ways, including but not limited to audibly and visually. A visual display could be on the wireless mobile unit 410 itself, or to a display unit connected thereto, for example.

As previously stated, the information output for the wireless mobile unit 410 can be that of traffic information. For example, controller 520 can constantly receive traffic information from an external information source 550, such as the Internet 560. Based upon mapping information stored in message server data base 540, the controller 520 can then essentially parce the information received into various sectors of regions (as defined by the parameters of the system), or can receive only information related to a plurality of geographic regions or a single geographic region. As such, information specific to the geographic region, such as traffic information, information relating to downed trees, other problems within the designated region, etc. can be output to the wireless mobile unit 410.

In a further preferred embodiment, problems relating to a particular road closure can be received from controller 520 and can be output to the wireless mobile unit 410. In addition, since mapping information is stored in message server data base 540, controller 520 can report not only problem situations, but also alternate routes of travel to a wireless mobile unit 410 entering a particular geographic region.

Figure 8:
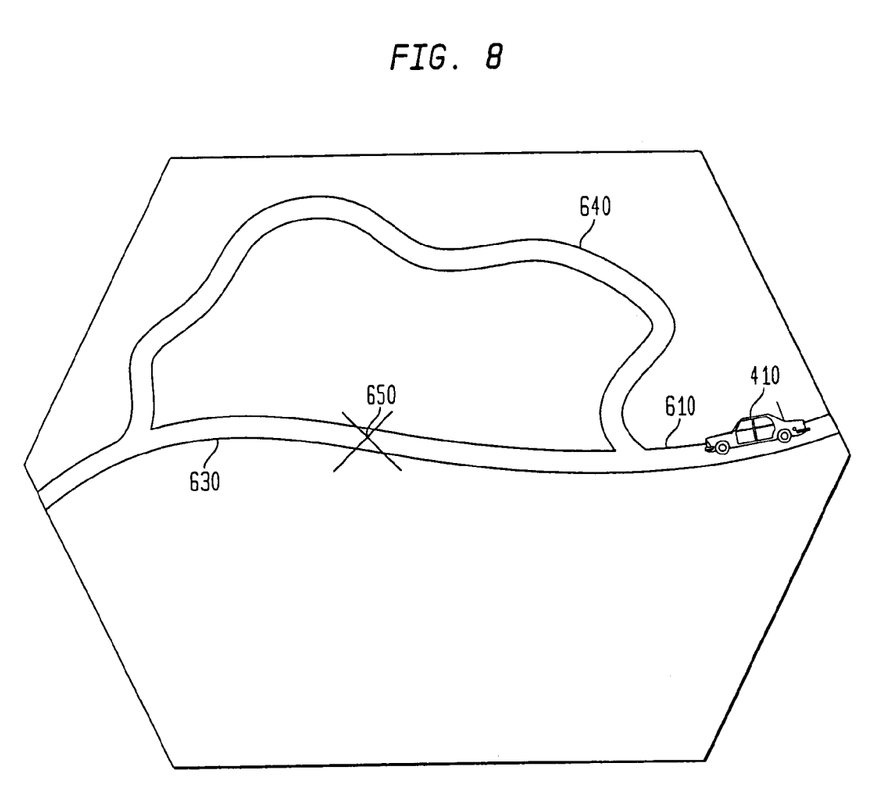
FIG. 8 is a diagram illustrating a specific example of the present application.

For example, as shown in FIG. 8, the wireless mobile unit 410 is traveling on a first road 610. Upon receiving information from a wireless mobile unit 410 enabling a determination that a wireless mobile unit 410 has entered the designated region shown in FIG. 8 (through a controlling base station and WSC 420); and upon receiving information from an external information source 550 such as the Internet 560 indicating that a tree has fallen in the area 650 indicated by the X as shown in FIG. 8; the information output for the wireless mobile unit 410 can indicate that the tree has fallen and can further indicate that the user avoid the main route 630 as shown in FIG. 8 and take an alternate route 640 as shown in FIG. 8. Using GPS or assisted GPS information, speed and direction of travel of the wireless mobile unit 410, and time of travel can be determined to be used in alternate route selection. These map matching techniques are known to those of ordinary skill in the art and can function, for example, when message server data base 540 is a GIS which further includes GIS processing software that enables geographic functions. They can be used to determine and define a new route using route matching/route determining techniques. Further, previous positions can be used to determined the exact road that a person is on. Thus, the wireless mobile unit 410 receives information relating to the designated region that he has entered, with that information including an alternate route of travel. This information can be audibly output, displayed, etc. Thus, such region specific information can be quite useful to a user.

As previously stated, the information received from a wireless mobile unit 410 in Step S2 of FIG. 6 can include information for determining a location of the wireless mobile unit 410 such as a GPS signal or assisted GPS signal. In addition, the information received from the wireless mobile unit 410 can include a particular signal requesting specific information. For example, a user could subscribe to a plurality of services wherein one service provides the user with traffic information for a designated region; another service provides the user with suggested alternate routes of travel; another service provides the user with the locations of stores within the designated region, such as restaurants for example; and another service provides the user with information relating to fuel sources within the designated region, such as gas stations for example. Each of the services is then attached, for example, to a different key on a keypad such as when the user presses a number key, a signal is sent, through a controlling base station and WSC 420 to location-based message server 450. For example, when a user presses a number 1 key, a first signal is sent from the wireless mobile unit 410 in Step S2 triggering a request for the receipt of traffic information; a second key 2 triggers a request for alternate route suggestions; a third key 3 triggers a request for restaurant locations within the region; and a fourth key 4 triggers a request for gas station locations within a designated region. The term designated region refers to a region that is designated based upon determining that the wireless mobile unit 410 has entered a particular region. Information such as gas station location, restaurant location, etc. can be stored in message server data base 540.

This aspect or embodiment of the present application can be varied in many ways as will be apparent to those of ordinary skill in the art. For example, especially relating to problem and traffic information, this information can be output to wireless mobile units located in regions neighboring a designated region, for example. In other words, upon a wireless mobile unit 410 entering a particular region, it can receive information relating to regions or cells neighboring the designated region separate from or along with information for the designated region, to thereby allow a user to plan alternate routes of travel to avoid problems. Depending upon the severity of the problem, the information could even be sent to second, third or other nth order neighboring regions to allow for the user to change his route, such as when a major highway has been closed, a tunnel or bridge has been closed, etc.

Other types of information that could be provided to the wireless mobile unit 410 relating to the designated region or neighboring region can include weather information specific to the region, locations of public telephones within the region, retail shops or malls within the regions, etc. For example, relating to retail shops or malls for example, customer or user profiles for users of wireless mobile units can be stored in message server database 540. The profiles may include, for example, specific items a user likes to shop for, such as antiques, for example. Then, as a wireless mobile unit 410 of a user enters a region or cell containing stores matching the profile, such as antique stores for example, information is output to the wireless mobile unit 410 indicating such stores within the region; and optionally indicating locations of such stores within the region. It should be understood that this aspect can be used to target any designatable thing or category of things within a region including, but not limited to restaurants, health clubs, bars, banks, etc. In addition, the aforementioned aspects of route determination and map matching can also be applied to illustrate travel routes to targeted places.

In another aspect, information relating to geographic aspects of a region can be stored, requested and output. For example, a traveler with a wireless mobile unit 410 can send information to controller 520 indicating a particular road or exit off a major highway, for example. This could be particularly useful to truckers traveling many miles down a major interstate, for example. The controller 520 then receives this information and compares it to map information prestored in message server database 540. Upon the wireless mobile unit 410 entering a region or cell containing the desired road or exit, the controller 520 outputs this information to the wireless mobile unit 410 of the trucker. Thereby, the trucker is made aware of the desired exit upon entering a cell or designated region. Optionally, location of the exit could be output.

Figure 7:
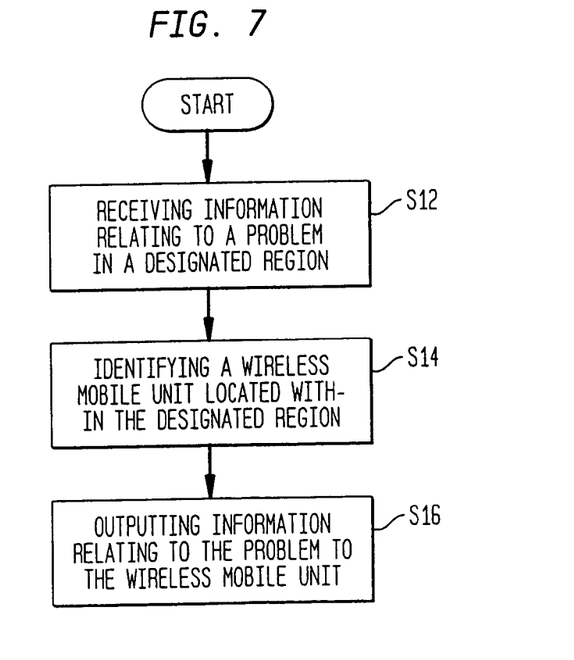
FIG. 7 is a flowchart illustrating the method of operation of a second embodiment of the present application.

A second embodiment or aspect of the present application is shown in FIG. 7. In this aspect, controller 520 receives information relating to a problem in Step S12 from an external information source 550. The problem can be road closure for example. The controller 520 then determines the particular region in which the problem is located, through the use of the information message server data base 540 for example. Thereafter, a wireless mobile unit 410, or a plurality of wireless mobile units subscribing to location-based message server 450, which are located within the designated region (and/or a neighboring region) are identified in Step S14. Thereafter, information relating to the problem is output for, and eventually to the wireless mobile unit 410 or a plurality of wireless mobile units within the designated region in Step S16. As such, once a problem is identified within a particular geographic region, wireless mobile units located within the designated region can be identified and information relating to the problem can be output thereto.

Similar to the first embodiment of the present application, the output information can relate to traffic problems, can include alternate routes of travel, etc. The problems can relate to a road closure or other types of traffic problems. In addition, the location of the wireless mobile units which receive the output information can be those located within a designated region and/or those within regions neighboring the designated region as first order neighbors, second order neighbors, and third order neighbors, etc., depending upon the severity of the problem.

The invention being thus described, it will be obvious that the same may be varied in many ways. For example, designated regions can be any particular defined area, such as cells or cell sectors for example. Such variations are not to be regarded as a departure from the spirit and scope of the invention, and all such modifications as would be obvious to one of ordinary skill in the art are intended to be included within the scope of the following claims.

We claim:

1. A location-based messaging method in a wireless communication network comprising:
   receiving information sent from a wireless mobile unit;
   determining that the wireless mobile unit has entered a designated region based upon the received information; and
   outputting information relating to the designated region for the wireless mobile unit upon determining that the wireless mobile unit has entered the designated region, without requiring access to a customer profile stored at a base station.

2. The location-based messaging method of claim 1, wherein the output information is output to the wireless mobile unit.

3. The location-based messaging method of claim 1, wherein the output information further includes traffic information.

4. The location-based messaging method of claim 1, wherein the output information further includes information relating to a problem within the designated region.

5. The location-based messaging method of claim 1, further comprising:
   storing map information for the designated region, wherein the output information includes map information.

6. The location-based method of claim 1, further comprising:
   receiving information relating to the designated region from an external source, wherein information relating to the received information is output to the wireless mobile unit.

7. The location-based messaging method of claim 1, further comprising:
   determining a location of the wireless mobile unit, wherein the location is used to determine that the wireless mobile unit has entered the designated region.

8. The location-based messaging method of claim 1, further comprising, prestoring information relating to a user of the wireless mobile unit, wherein the information is output upon the wireless mobile unit entering a region designated based upon the prestored information.

9. A location-based messaging method in a wireless communication network comprising:
   receiving information relating to a problem in a designated region of the wireless communications network;
   identifying a wireless mobile unit located within the designated region; and
   outputting information, related to the problem within the designated region, for the wireless mobile unit located in the designated region, without requiring access to a customer profile stored at a base station.

10. The location-based messaging method of claim 9, wherein the output information is output to the wireless mobile unit.

11. The location-based messaging method of claim 9, wherein the received information relates to a traffic problem.

12. A location-based messaging apparatus, comprising:
    a controller adapted to receive information from a wireless mobile unit, adapted to determine that the wireless mobile unit has entered a designated region based upon the received information;
    said controller is adapted to output information relating to the designated region for the wireless mobile unit, upon determining that the wireless mobile unit has entered the designated region, without requiring access to a customer profile stored at a base station.

13. The location-based messaging apparatus of claim 12, wherein the output information is output to the wireless mobile unit.

14. The location-based messaging apparatus of claim 12, wherein the output information relates to a problem within the designated region.

15. The location-based messaging apparatus of claim 12, further comprising:
    a memory, adapted to store map information for the designated region, wherein the output information includes map information.

16. The location-based messaging apparatus of claim 12, wherein the controller is adapted to receive information relating to the designated region from an external source, and wherein information relating to the received information is output to the wireless mobile unit.

17. The location-based messaging apparatus of claim 12, wherein the controller is adapted to determine a location of the wireless mobile unit, and is adapted to use the determined location in determining that the wireless mobile unit has entered the designated region.

18. A location-based messaging apparatus in a wireless communication network, comprising:
    a controller adapted to receive information relating to a problem in a designated region of the wireless communication network;
    said controller is adapted to identify a wireless mobile unit located within the designated region; and adapted to output information, related to the problem within the designated region, for the wireless mobile unit, without requiring access to a customer profile stored at a base station.

19. The location-based messaging apparatus of claim 18, wherein the output information is output to the wireless mobile unit.

20. The location-based messaging apparatus of claim 18, wherein the controller is adapted to identify a plurality of wireless mobile units within the designated region and is adapted to output information to each of the identified wireless mobile units.

21. The location-based apparatus of claim 18, further comprising:

a memory, adapted to store map information for the designated region, wherein when the received information is indicative of a traffic problem within the designated region, the controller is adapted to determine an alternate route of travel for output to the wireless mobile unit.

\* \* \* \* \*